(12) United States Patent
Scherrer et al.

(10) Patent No.: US 10,001,012 B2
(45) Date of Patent: Jun. 19, 2018

(54) TURBINE WHEEL OF AN EXHAUST-GAS TURBOCHARGER

(71) Applicant: BorgWarner Inc., Auburn Hills, MI (US)

(72) Inventors: Frank Scherrer, Frankenthal (DE); Menno Roder, Kirchheimbolanden (DE); Gerald Schall, Bobenheim-Roxheim (DE); Juergen Strelbitski, Orbis (DE); Michael Loewenberg, Weierhof/Bolanden (DE); Stefan Eisinger, Bornheim (DE); Adnan Adilovic, Mainz (DE); Achim Klein, Kaiserslautern (DE)

(73) Assignee: BorgWarner Inc., Auburn Hills, MI (US)

( * ) Notice: Subject to any disclaimer, the term of this patent is extended or adjusted under 35 U.S.C. 154(b) by 273 days.

(21) Appl. No.: 14/778,742

(22) PCT Filed: Mar. 25, 2014

(86) PCT No.: PCT/US2014/031724
§ 371 (c)(1),
(2) Date: Sep. 21, 2015

(87) PCT Pub. No.: WO2014/165355
PCT Pub. Date: Oct. 9, 2014

(65) Prior Publication Data
US 2016/0053616 A1   Feb. 25, 2016

(30) Foreign Application Priority Data

Apr. 5, 2013 (DE) .................. 10 2013 005 890

(51) Int. Cl.
*F01D 5/04* (2006.01)
*F01D 5/14* (2006.01)
(Continued)

(52) U.S. Cl.
CPC ............... *F01D 5/04* (2013.01); *F01D 5/141* (2013.01); *F02B 33/40* (2013.01); *F02B 37/00* (2013.01);
(Continued)

(58) Field of Classification Search
None
See application file for complete search history.

(56) References Cited

U.S. PATENT DOCUMENTS

| 4,408,959 A | 10/1983 | Long et al. | |
| 4,787,821 A * | 11/1988 | Cruse | B23K 20/021 |
| | | | 228/118 |

(Continued)

FOREIGN PATENT DOCUMENTS

| JP | 6117101 U | 1/1986 |
| JP | 02173322 A | 7/1990 |

(Continued)

OTHER PUBLICATIONS

Written Opinion and International Search Report in International Application No. PCT/US2014/031724, dated Jul. 18, 2014.
Japanese Office Action (with English language translation) dated Aug. 15, 2017, in Japanese Patent Application No. 2016-506327.

*Primary Examiner* — Logan Kraft
*Assistant Examiner* — Jason Davis
(74) *Attorney, Agent, or Firm* — Eric L. Doyle; Stephan A. Pendorf; Patent Central LLC

(57) ABSTRACT

A turbine wheel (1) of an exhaust-gas turbocharger (2), formed from a titanium aluminide material, having a wheel back (7) which is of closed configuration as viewed from an axial direction (A) and which has an outer contour (17), a hub (3) which extends from the wheel back (7) and which tapers along the axial direction (A), and a multiplicity of turbine blades (4) which extend from the wheel back (7) and from the hub (3) and which blades extend outward in a radial (Continued)

direction (R), as far as a connection region outer diameter (DAB) at least in a connection region (5). The wheel back (7) has, in an outer region (11) adjoining the connection region (5), a wheel back outer diameter (DRR) which is greater than or equal to the connection region outer diameter (DAB).

14 Claims, 4 Drawing Sheets

(51) Int. Cl.
*F02B 33/40* (2006.01)
*F02B 37/00* (2006.01)

(52) U.S. Cl.
CPC ...... *F05D 2220/40* (2013.01); *F05D 2230/10* (2013.01); *F05D 2230/21* (2013.01); *F05D 2230/25* (2013.01); *F05D 2240/24* (2013.01); *F05D 2300/174* (2013.01)

(56) References Cited

U.S. PATENT DOCUMENTS

| | | | |
|---|---|---|---|
| 6,754,954 | B1 | 6/2004 | Decker |
| 8,096,777 | B2 * | 1/2012 | Yokoyama ............... F01D 1/08 416/223 R |
| 2005/0036893 | A1 | 2/2005 | Decker |
| 2007/0119908 | A1 | 5/2007 | Renaud et al. |
| 2007/0128018 | A1 | 6/2007 | Sumser et al. |
| 2008/0092538 | A1 | 4/2008 | Fledersbacher et al. |
| 2011/0091324 | A1 | 4/2011 | Holzschuh |

FOREIGN PATENT DOCUMENTS

| | | |
|---|---|---|
| JP | 09144550 A | 6/1997 |
| JP | 2005048769 A | 2/2005 |
| JP | 2005060829 A | 3/2005 |

* cited by examiner

TURBINE WHEEL OF AN EXHAUST-GAS TURBOCHARGER

BACKGROUND OF THE INVENTION

Field of the Invention

The invention relates to a turbine wheel for the supercharging of a combustion engine, in particular of an internal combustion engine.

Description of the Related Art

A turbine wheel of said type is known from DE 10 2005 050 707 A1. In said document, it is described that an Ni-based material of the turbine wheel has an adverse effect on the acceleration of the rotor (assembly formed from the turbine wheel, the compressor wheel and the shaft) because turbine wheels composed of said material have a high mass moment of inertia.

As a measure for reducing the mass moment of inertia, said document describes the use of titanium-aluminum alloys which have a lower density, such that the mass moment of inertia of a turbine wheel composed of a material of said type can be reduced.

BRIEF SUMMARY OF THE INVENTION

It is an object of the present invention to provide a turbine wheel composed of titanium aluminide (TiAl) which is of simple dimensioning and thus construction, wherein a high level of efficiency of the turbine can be achieved.

By virtue of the wheel back outer diameter being greater than or equal to the connection region outer diameter of the turbine blades, a closed wheel back is formed, resulting in lower ventilation losses. In this way, the efficiency of the turbine composed of a titanium aluminide material can be increased.

In one refinement, the wheel back has, at least adjacent to the connection region, a wall thickness which is in a ratio of 1.5:1 to 2.5:1, in particular of 1.7:1 to 2.3:1, particularly preferably of 1.8:1 to 2.2:1 with respect to a wall thickness of the turbine blade.

When the internal combustion engine is in overrun operation, the internal combustion engine remains in rotation owing to its mass inertia. During this time, no fuel is injected, and as a result cold exhaust gas or air flows to the turbocharger, such that the turbine wheel cools down relatively quickly. The cooling of the turbine wheel results in internal stresses in the turbine wheel. In the case of turbine wheels composed of Ni-based materials from the prior art, said internal stresses are non-critical. The ductility, that is to say the ability of the titanium aluminide material to be deformed without damage, however decreases with falling temperature in the relevant temperature range. Furthermore, owing to a coefficient of expansion of titanium aluminide materials being non-constant with respect to temperature, more intensely cooled regions cause high internal stresses. In the case of turbine wheels composed of titanium aluminide materials, a combination of the non-constant coefficient of expansion and the decreasing ductility can result in the formation of cracks in the turbine wheel. It has surprisingly been found that, if the ratio of the wall thickness of the turbine blades with respect to the wall thickness of the wheel back is the ratio mentioned in the preceding paragraph, it is ensured that adequate material is provided, which yields slower and thus more homogeneous cooling in overrun operation.

With the stated ratio, the mass inertia of the turbine wheel is, owing to the low density of the titanium aluminide material, still low enough that an expedient acceleration characteristic of the exhaust-gas turbocharger can be achieved.

In one refinement, a wheel hub region extending in the axial direction merges in continuous fashion, in a chamfer region with radially outwardly increasing connection radii, into an intermediate region, extending in the radial direction, of the wheel back.

The configuration of the wheel back as described in the preceding paragraph yields a turbine wheel of high strength.

In a further refinement, the turbine blades extend from the wheel back and from the hub of the turbine wheel with a turbine blade connection radius, the turbine blade connection radius being constant over an entire length of extent of the turbine blade.

Owing to this refinement, a heat transfer rate from the wheel back and the hub to the turbine blade is achieved which is substantially constant over the length of extent of the turbine blade. In this way, during the cooling process, the wheel back and the hub can release the heat stored therein to the turbine blade in uniform fashion, such that non-uniform temperature distributions along the length of extent, and thus internal stresses along the line of extent, are reduced to a level tolerable for titanium aluminide materials.

In a further refinement, a ratio of the wall thickness of the turbine blades to the connection region outer diameter lies in the range of up to 0.7:40; particularly preferably between 0.3:40 and 0.5:40; in particular between 0.35:40 and 0.45:40.

It has been found that, with the stated ratio, an adequately stable turbine blade can be formed.

BRIEF DESCRIPTION OF THE SEVERAL VIEWS OF THE DRAWINGS

Further details, features and advantages of the invention become apparent from the following description of exemplary embodiments with reference to the drawing, in which.

DETAILED DESCRIPTION OF THE INVENTION

Figure 2:
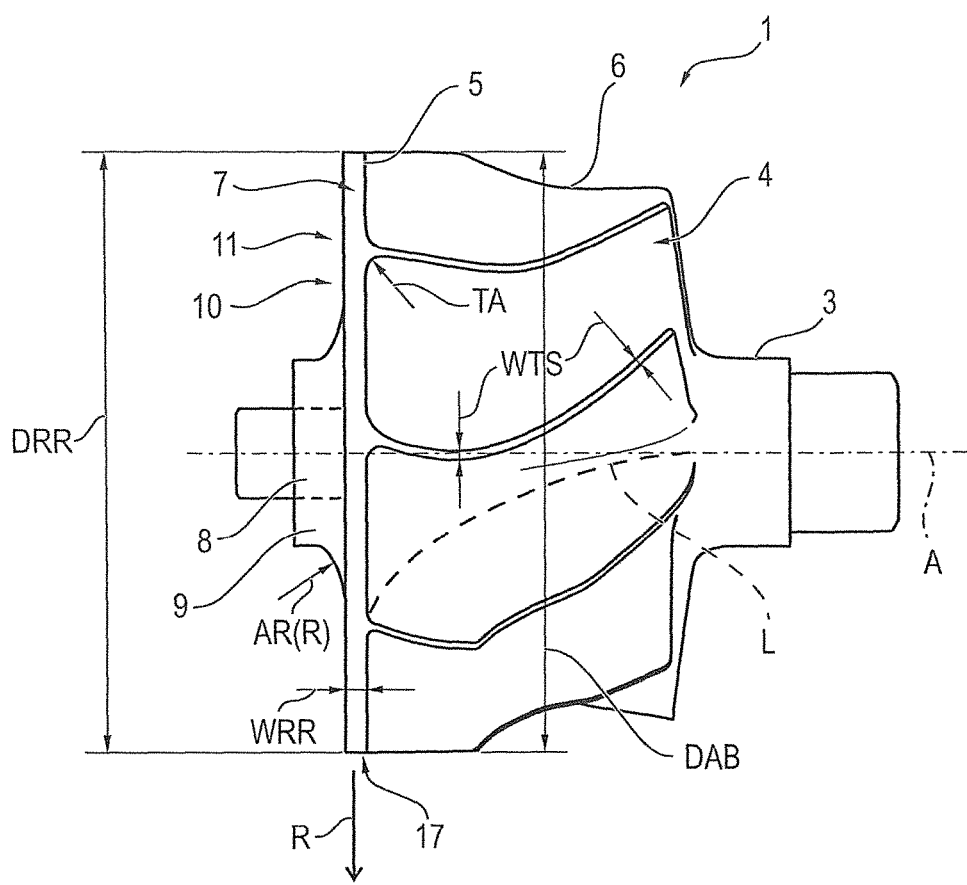
FIG. 2 shows a side view of a first embodiment of a turbine wheel according to the invention.

FIG. 2 illustrates a first embodiment of the turbine wheel 1 according to the invention composed of a titanium aluminide (TiAl) material. The turbine wheel 1 may be cast from a titanium aluminide alloy in a casting process. The turbine wheel 1 may also be milled from a forged titanium aluminide blank.

The turbine wheel 1 has a circular outer contour 17 and a hub 3 on which there is arranged a multiplicity of turbine blades, one of which is denoted, as a representative of all of the turbine blades, by the reference sign 4. The turbine blades 4 extend along a length of extent L. Each of the turbine blades 4 has a connection region 5 in which an imaginary circle drawn around the turbine blades 4 at the radially outer tips thereof has an outer diameter DAB. The connection region 5 is adjoined by an outlet region 6 of the turbine blades 4, which in the case of the embodiment of FIG. 2 has a smaller outer diameter than the connection region 5.

The turbine wheel 1 also has a wheel back 7 which adjoins the connection region 5 and which is formed on the hub 3, as can be seen from FIG. 2.

The wheel back 7 has, in an outer region 11, an outer diameter DRR which at least substantially corresponds to the diameter DAB but preferably has the same value as the diameter DAB.

Furthermore, the wheel back 7 has a wall thickness WRR. The turbine wheel blades have a wall thickness WTS, wherein FIG. 2 shows, by way of example, two regions of the turbine blades 4 in which the stated wall thickness region WTS is indicated. The wheel back 7 is thickened slightly and has, at least adjacent to the connection region 5, a wall thickness WRR which is in a ratio of 1.5:1 to 2.5:1, in particular of 1.7:1 to 2.3:1, particularly preferably of 1.8:1 to 2.2:1 with respect to a wall thickness WTS of the turbine blade 4. Owing to the slight thickening, it is ensured that the cooling of the turbine wheel 1 in a period of overrun operation following a period of normal or elevated engine load of the internal combustion engine is slowed. The slowed cooling has proven to be advantageous, in the case of turbine wheels composed of titanium aluminide, for a long service life. The reason for this may be seen in the fact that high internal stresses in the turbine wheel 1 that may arise as a result of non-homogeneous cooling when a temperature at which the ductility of the titanium aluminide material decreases is reached can be eliminated, or at least reduced to a tolerable level.

Figure 3:
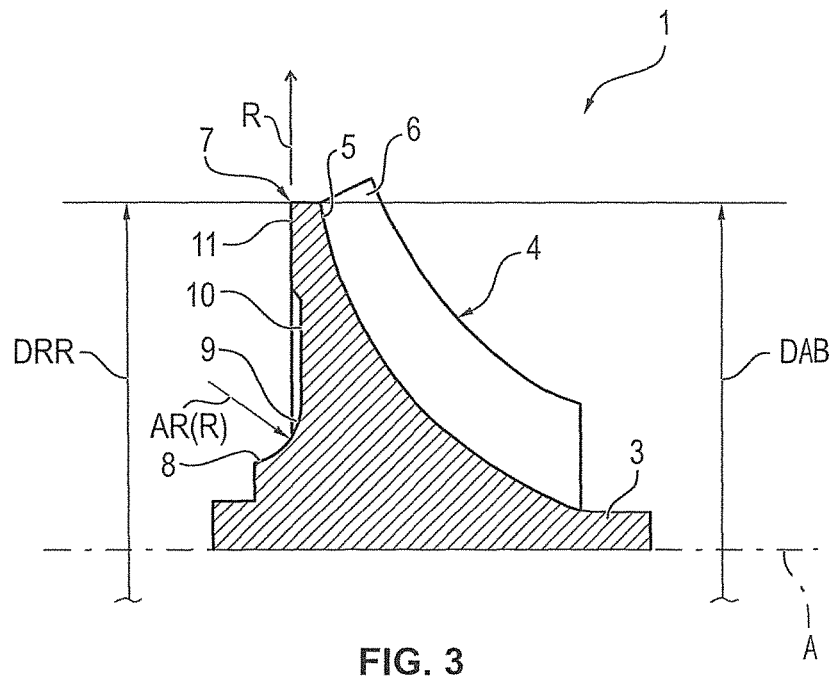
FIG. 3 is a sectional illustration through a second embodiment of the turbine wheel according to the invention, wherein only the upper half of the turbine wheel is illustrated in the illustration selected in FIG. 3.

FIG. 3 illustrates a second embodiment of the turbine wheel 1 according to the invention, in which all elements that correspond to those in FIG. 2 are denoted by the same reference signs, such that, in this regard, reference may be made to the above description of FIG. 2.

The turbine wheel 1 of the embodiment as per FIG. 3 is a so-called "mixed-flow turbine wheel", the connection region 5 of which has, as in the case of the embodiment of FIG. 2, an outer diameter DAB which corresponds to the outer diameter DRR of the wheel back 7. The outlet region 6 is, as shown in FIG. 3, extended upward in a radial direction R, giving rise to the special geometry of the mixed-flow turbine wheel which can be driven by an exhaust-gas stream impinging on the turbine wheel 1 obliquely with respect to the axial direction A.

Figure 4:
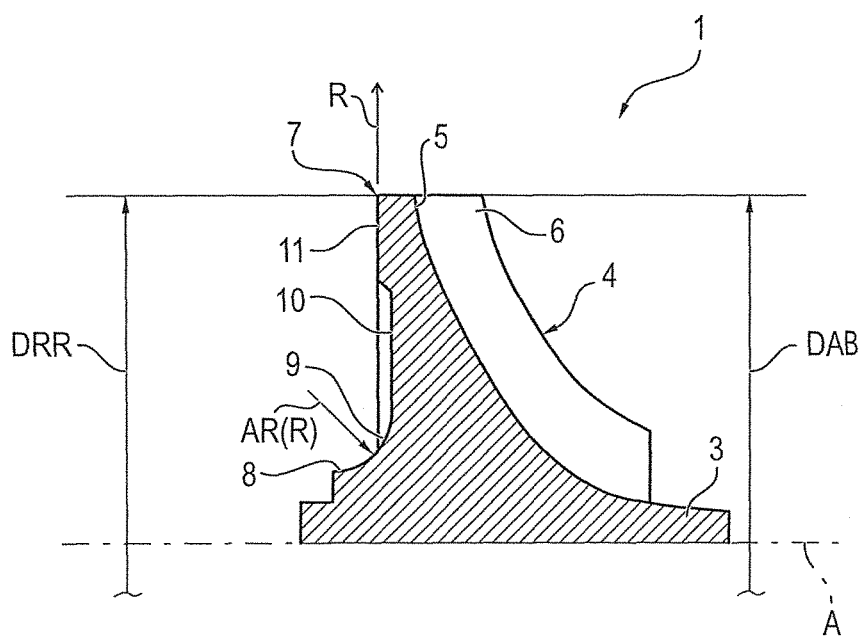
FIG. 4 is a sectional illustration of the embodiment of the turbine wheel according to the invention illustrated in FIG. 1.
Figure 5:
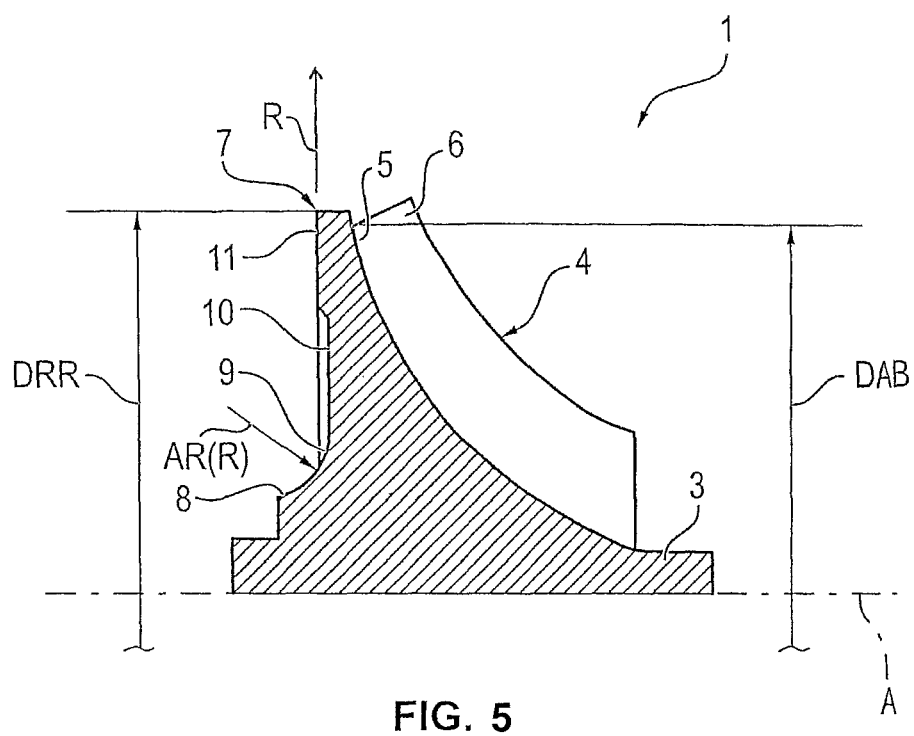
FIG. 5 is a sectional illustration through a third embodiment of the turbine wheel according to the invention, wherein only the upper half of the turbine wheel is illustrated in the illustration selected in FIG. 5.

Furthermore, FIGS. 3 and 4 show, in section, the design of the wheel back 7, in which a wheel hub region 8 extending in the axial direction A merges, in a rounded chamfer region 9 with a connection radius A(R), into an intermediate region 10, which extends in the radial direction R, of the wheel back 7. Here, a connection radius AR(R) increases continuously with increasing distance outward from the axis of rotation A. This yields a rigid and thus dimensionally stable turbine wheel 1 which stores heat, and releases said heat to the outer region 11 of the wheel back 7, over a relatively long period of time. In this way, both the wheel back 7 in the outer region 11 and also regions of the turbine blades 4 adjoining said outer region cool down correspondingly more slowly in overrun operation.

Figure 1:
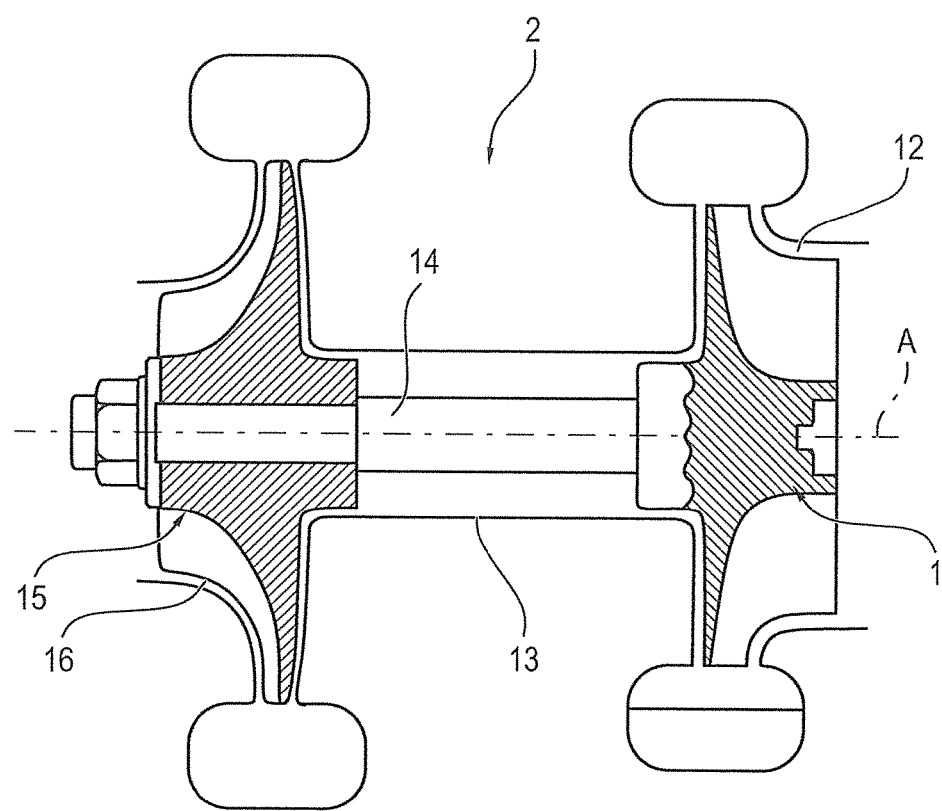
FIG. 1 shows a schematically greatly simplified diagrammatic illustration of an exhaust-gas turbocharger according to the invention.

FIG. 4 shows the embodiment of the turbine wheel 1 according to the invention shown in FIG. 1, in a sectional illustration, corresponding to FIG. 3, of only the upper region, that is to say the region above the longitudinal axis A. This embodiment concerns a radial wheel which has, adjoining the connection region 5, an outlet region 6 which has the same outer diameter as the connection region 5.

In addition to the above written disclosure, reference is hereby explicitly made, for supplementation thereof, to the diagrammatic illustration of the invention in FIGS. 1 to 4.

LIST OF REFERENCE SIGNS

1 Turbine wheel
2 Exhaust-gas turbocharger
3 Hub
4 Turbine blades
5 Connection region
6 Outlet region
7 Wheel back
8 Wheel hub region
9 Chamfer region
10 Intermediate region
11 Outer region
12 Turbine housing
13 Bearing housing
14 Shaft
15 Compressor wheel
16 Compressor housing
17 Outer contour
DAB Connection region outer diameter
DRR Wheel back outer diameter
A Axial direction/longitudinal axis
AR(R) Connection radii
TA Turbine blade connection radius
R Radial direction
WRR Wall thickness of the wheel back
WTS Turbine blade wall thickness

The invention claimed is:

1. A turbine wheel (1) of an exhaust-gas turbocharger (2), formed from a titanium aluminide material, having
   a wheel back (7) which is of closed configuration as viewed from an axial direction (A) and which has an outer contour (17),
   a hub (3) which extends from the wheel back (7) and which tapers along the axial direction (A), and
   a multiplicity of turbine blades (4) which extend from the wheel back (7) and from the hub (3) and which extend outward in a radial direction (R), as far as a connection region outer diameter (DAB) at least in a connection region (5),
   the wheel back (7) having, in an outer region (11) adjoining the connection region (5), a wheel back outer diameter (DRR) which is greater than or equal to the connection region outer diameter (DAB),
   wherein the wheel back (7) has, at least adjacent to the connection region (5), a wall thickness (WRR) which is in a ratio of 1.5:1 to 2.5:1 with respect to a wall thickness (WTS) of the turbine blade (4).

2. The turbine wheel as claimed in claim 1, wherein a wheel hub region (8) extending in the axial direction (A) merges in continuous fashion, in a chamfer region (9) with radially outwardly increasing connection radii (AR(R)), into an intermediate region (10), extending in the radial direction (R), of the wheel back (7).

3. The turbine wheel as claimed in claim 1, wherein the turbine wheel is a forged and milled turbine wheel.

4. The turbine wheel as claimed in claim 1, wherein the turbine wheel is a cast turbine wheel.

5. The turbine wheel as claimed in claim 1, wherein the turbine wheel is adapted to being driven by an exhaust-gas stream flowing inward in the radial direction (R).

6. The turbine wheel as claimed in claim 1, wherein the turbine wheel is adapted to being driven by an exhaust-gas stream flowing obliquely both in the radial direction (R) and also in the axial direction (A).

7. An exhaust-gas turbocharger (2) for the supercharging of an internal combustion engine, having a turbine wheel (1) as claimed in claim 1.

8. The turbine wheel as claimed in claim 1, wherein the wheel back (7) has, at least adjacent to the connection region (5), a wall thickness (WRR) which is in a ratio of 1.7:1 to 2.3:1 with respect to a wall thickness (WTS) of the turbine blade (4).

9. The turbine wheel as claimed in claim 1, wherein the wheel back (7) has, at least adjacent to the connection region (5), a wall thickness (WRR) which is in a ratio of 1.8:1 to 2.2:1 with respect to a wall thickness (WTS) of the turbine blade (4).

10. The turbine wheel as claimed in claim 1, wherein a ratio of the wall thickness (WTS) of the turbine blades (4) to the connection region outer diameter (DAB) lies in the range of between 0.3:40 and 0.5:40.

11. The turbine wheel as claimed in claim 1, wherein a ratio of the wall thickness (WTS) of the turbine blades (4) to the connection region outer diameter (DAB) lies in the range of between between 0.35:40 and 0.45:40.

12. A turbine wheel (1) of an exhaust-gas turbocharger (2), formed from a titanium aluminide material, having
 a wheel back (7) which is of closed configuration as viewed from an axial direction (A) and which has an outer contour (17),
 a hub (3) which extends from the wheel back (7) and which tapers along the axial direction (A), and
 a multiplicity of turbine blades (4) which extend from the wheel back (7) and from the hub (3) and which extend outward in a radial direction (R), as far as a connection region outer diameter (DAB) at least in a connection region (5),
 the wheel back (7) having, in an outer region (11) adjoining the connection region (5), a wheel back outer diameter (DRR) which is greater than or equal to the connection region outer diameter (DAB),
wherein a ratio of the wall thickness (WTS) of the turbine blades (4) to the connection region outer diameter (DAB) lies in the range of between 0.3:40 and 0.7:40.

13. The turbine wheel as claimed in claim 12, wherein a wheel hub region (8) extending in the axial direction (A) merges in continuous fashion, in a chamfer region (9) with radially outwardly increasing connection radii (AR(R)), into an intermediate region (10), extending in the radial direction (R), of the wheel back (7).

14. A turbine wheel (1) of an exhaust-gas turbocharger (2), formed from a titanium aluminide material, having
 a wheel back (7) which is of closed configuration as viewed from an axial direction (A) and which has an outer contour (17),
 a hub (3) which extends from the wheel back (7) and which tapers along the axial direction (A), and
 a multiplicity of turbine blades (4) which extend from the wheel back (7) and from the hub (3) and which extend outward in a radial direction (R), as far as a connection region outer diameter (DAB) at least in a connection region (5),
 the wheel back (7) having, in an outer region (11) adjoining the connection region (5), a wheel back outer diameter (DRR) which is greater than or equal to the connection region outer diameter (DAB),
wherein the wheel back (7) has, at least adjacent to the connection region (5), a wall thickness (WRR) which is in a ratio of 1.5:1 to 2.5:1 with respect to a wall thickness (WTS) of the turbine blade (4), and
wherein a ratio of the wall thickness (WTS) of the turbine blades (4) to the connection region outer diameter (DAB) lies in the range of the range of between 0.3:40 and 0.7:40.

* * * * *